Jan. 19, 1965  A. J. ARNOLD  3,166,202
TANK LIFTING MECHANISM
Filed July 24, 1961  3 Sheets-Sheet 1

INVENTOR.
ALANSON JAMES ARNOLD
BY ANDREW K. FOULDS
HIS ATTORNEY

United States Patent Office 3,166,202
Patented Jan. 19, 1965

3,166,202
TANK LIFTING MECHANISM
Alanson James Arnold, New Orleans, La., assignor to American Radiator & Standard Sanitary Corporation, New York, N.Y., a corporation of Delaware
Filed July 24, 1961, Ser. No. 126,177
9 Claims. (Cl. 214—1)

The present invention relates to an article lifting and transfer mechanism and more particularly to a mechanism for lifting a ceramic article from a mold and transferring it to a take-off mechanism.

In the manufacture of ceramic articles such as ceramic tanks, the articles are formed in an open-ended mold and after formation are removed from the mold by lifting and transfer mechanism and deposited onto a suitable take-off mechanism, such as a conveyor.

Heretofore, such lifting and transfer mechanisms have comprised a plurality of suction or gripper heads which engage the sides of the tank to grip it prior to the lifting operation. In such devices, the gripper heads are moved in unison toward the side walls of the tank to grip the tank. However, it has been found that due to slight variations in the dimensions of the tank and/or in movement of the gripper heads, one or more of the gripper heads do not bear against the tank walls with sufficient pressure to grip the tank firmly thus causing the tanks to fall when lifted. It has also been found that if the gripper heads are moved in unison with sufficient pressure to permit all the heads to grip the tanks, the heads will leave an imprint on the side walls of the tanks, which is undesirable.

The present invention overcomes these difficulties and provides an improved mechanism for lifting a tank which virtually eliminates the danger of the tank falling off the gripper heads.

Another object of the present invention is to provide an improved tank lifting mechanism which will permit each of the heads to bear against the tank with substantially the same pressure.

Another object of the invention is to provide an improved tank lifting mechanism which will permit the lifting heads to operate individually.

A further object of the present invention is the provision of an improved tank lifting mechanism which will not leave an imprint on the side walls of the tank during the lifting operation.

Other and further objects of the invention will be obvious upon an understanding of the illustrative embodiments about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 4 is an enlarged sectional view showing one of the lifting heads of the present invention; and FIG. 5 is a front elevational view of the lifting head shown in FIG. 4.

Figure 1:
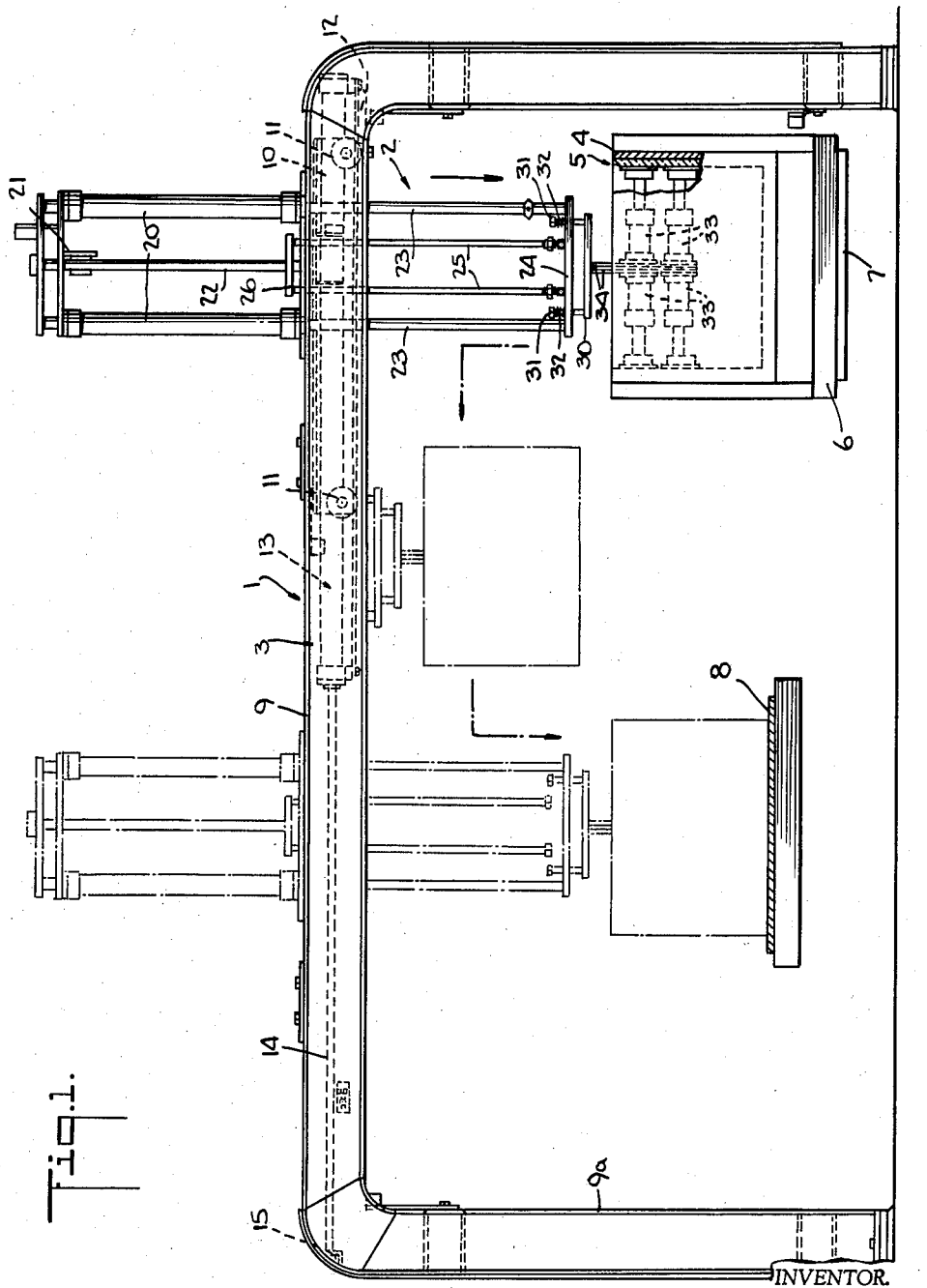
FIG. 1 is a side elevational view showing the means for lifting a tank from a mold and for transferring it to a suitable take-off conveyor.
Figure 2:
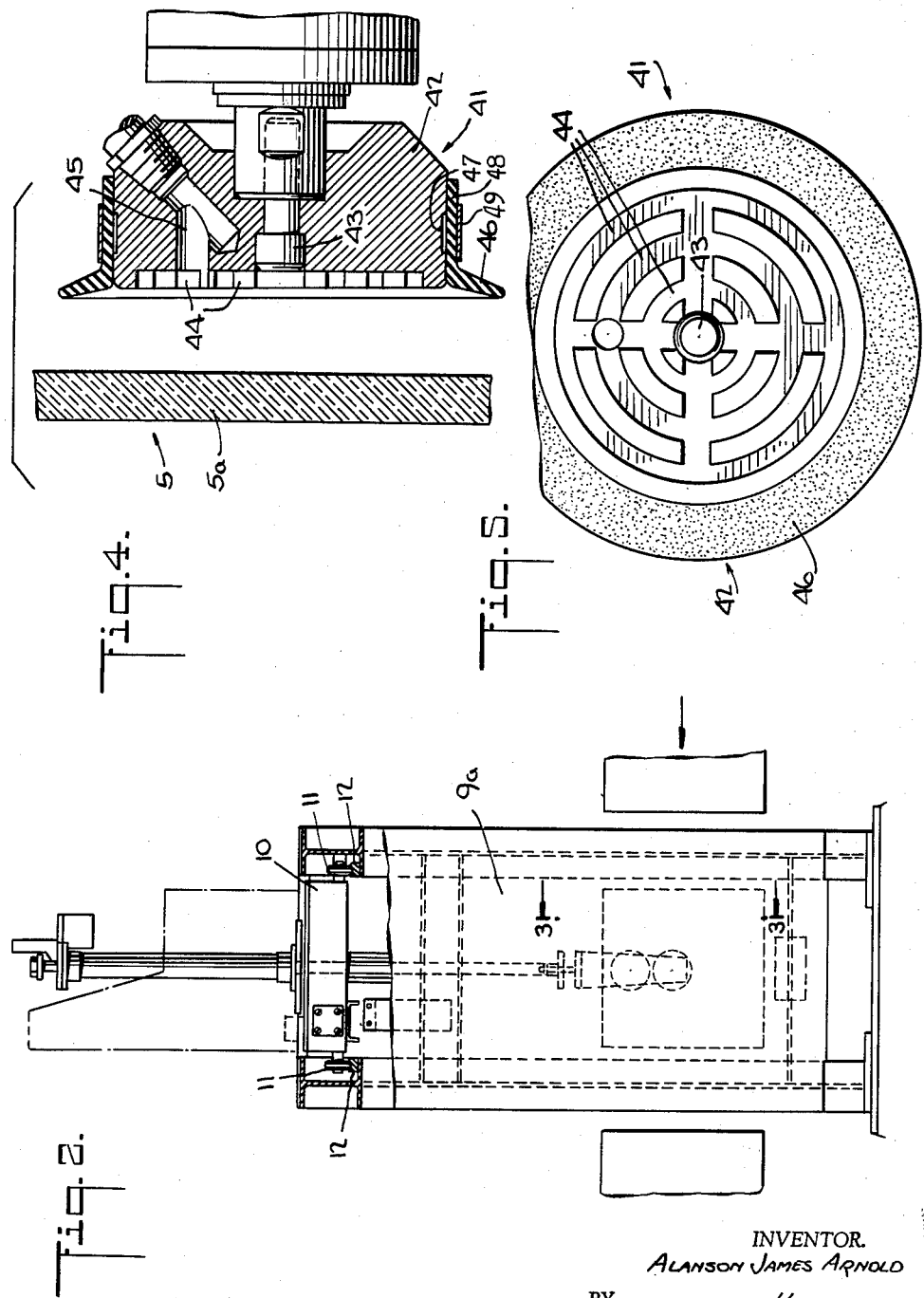
FIG. 2 is a side elevational view of the tank lifting mechanism shown in FIG. 1.

Referring more particularly to FIG. 1, the mechanism of the present invention comprises a U-shaped frame 1 adapted to hold the tank lifting mechanism 2 and the transfer mechanism 3. The frame 1 comprises an elevated horizontal portion 9 supported by a pair of leg portions 9a.

A plurality of molds 4 each positioned on a pallet 6 and containing a tank 5, are moved beneath the frame 1 by a conveyor 7. The tanks 5 which have been formed in the molds 4 are made of an unfired or "green" ceramic of substantially rectangular configuration. The tanks 5, as shown in the drawing, are water closet tanks consisting of (see FIG. 3) side walls 5a, bottom wall 5b and an open top 5c. The tanks 5 have dried sufficiently to permit the ceramic to hold its shape and to have shrunk slightly and become separated from the side walls of the mold 4.

In this position, the tank 5 is lifted by inserting the lifting mechanism 2 through its open end 5c and causing a plurality of gripper heads (described in greater detail hereinafter) to grip the sides 5a of the tank. The lifting mechanism is then pulled up to lift the tank 5. The tank 5 is then transferred by the transfer mechanism 3 to a position overlaying a take-off conveyor 8, as shown in broken lines in FIG. 1, where the lifting mechanism 2 then deposits the tank 5 on the take-off conveyor 8 and the gripper heads release the tank.

Positioned within the horizontal portion 9 of the frame 1 is a carriage 10 which has wheels 11 adapted to ride on rails 12 mounted on horizontal portion of frame 1. The carriage 10 has the tank lifting mechanism 2 mounted thereon and is mounted on hydraulically controlled cylinder 13 which has its piston rod 14 anchored at 15 to one end of the frame 1 to permit the cylinder 13 to move relative thereto on a horizontal plane from a position overlying the molds 4 to a position overlying the take-off conveyor 8.

The tank lifting mechanism 2 which is mounted on the carriage 10 comprises a pair of vertically mounted cylinders 20 mounted on frame 21 provided with a central guide post 22. The cylinders 20 control piston rods 23 which are connected together by a connecting bar 24. A pair of conduits 25 are anchored at their lower ends to the bar 24 and at their upper ends to a strap 26. A holding frame 30 depends from bar 24 by means of bolts 31 which have springs 32 therearound adapted to act as shock absorbers.

The holding frame 30 has a plurality of gripper-head assemblies 33 depending therefrom through the intermediation of support brackets 34 to which the gripper-head assemblies 33 are attached.

It will be seen that when each tank 5 is to be lifted out of its mold 4, the gripper-head assemblies 33 are first lowered into the tank 5 through its open end 5c. The gripper-head assemblies 33 are activated so that the gripper heads grip the inner side walls 5a of the tanks. The gripper head assemblies 33 are then lifted carrying a tank 5 with them and are moved by carriage 10 over the take-off conveyor 8 where they are lowered until the tanks 5 are deposited on the conveyor 8 at which point the tanks 5 are released and the gripper head assemblies 33 withdrawn.

Figure 3:
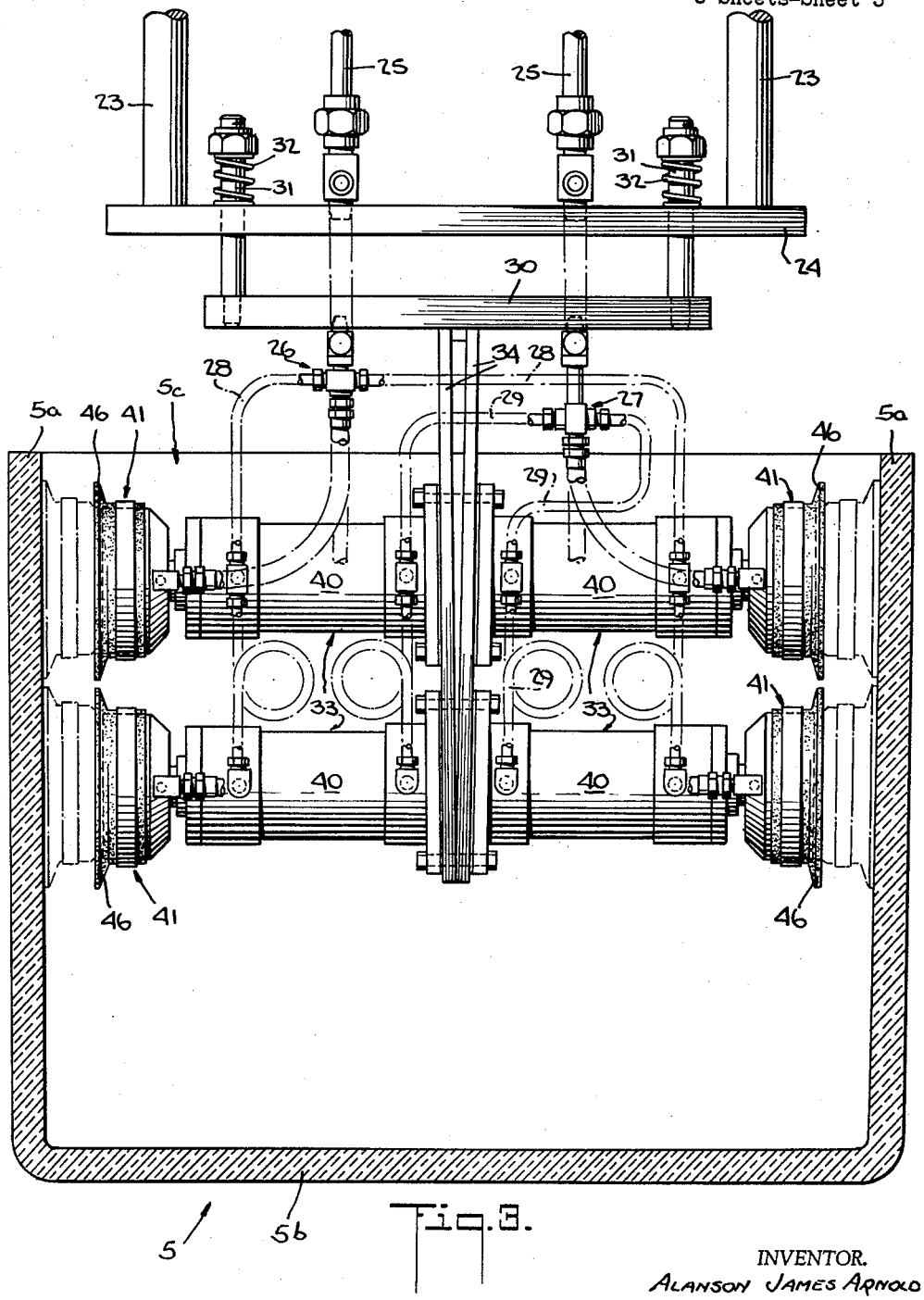
FIG. 3 is an enlarged sectional view taken along line 3—3 of FIG. 2 and showing the operation of the lifting heads.

The gripper head assemblies 33 of the present invention are shown in greater detail in FIGS. 3 to 5 and comprise a plurality of cylinders 40, four of which are shown in the drawing, having piston rods (not shown) to which the gripper heads 41 are attached. The heads 41 are adapted to move relative to cylinders 40 under the control of a suitable under pressure fluid such as air, until each gripper head 41 engages the inner surface of the side walls 5a of the tanks 5 as will be more fully discussed hereinafter.

Each gripper head 41 is shown in detail in FIGS. 4 and 5 and comprises a block 42 attached to the piston rod (not shown) of the cylinder 40 by means of bolt 43. The face of each block 42 is flat and has a plurality of arcuate suction grooves 44 to provide a wide surface area and permit the heads to grip the tanks more securely. Grooves 44 communicate with a suction bore 45 in the block 42 so that when air is evacuated from the grooves 44 the head 41 will firmly grip the side walls 5a of the tanks 5. To form an air tight seal with the side walls 5a of the tank 5, a sealing ring 46 made of impermeable material, such as synthetic rubber, surrounds the outside of the block 42. The block 42 has an annular groove 47 and the sealing ring 46 has a rearwardly extending flange 48 which extends over groove 47. A strap 49 surrounds the flange 48 at the groove 47 and pushes the flange 48 into groove 47 (not shown in drawing) to hold the sealing ring 46 in place.

With this structure, after each gripper head 41 is brought against the side walls 5a of the tanks 5, the sealing ring 46 forms an hermetic seal with the side walls 5a and when air is evacuated from the suction grooves 44 through suction hole 45, the head 41 is held firmly against the wall of the tank 5. Since the head 41 is engaged with the tank wall by its outward moving piston, the suction applied through conduit 45 does not leave an imprint on or near the green clay piece or tank. After the tank has been transferred to the take-off conveyor 8 the suction vacuum is broken by returning the grooves 44 in the head 41 to atmospheric pressure to permit the head 41 to release its grip on the side walls 5a of the tank 5.

Fluid under pressure for controlling the function of the gripper head assemblies 33 is supplied from a suitable source (not shown) through conduits 25 which are connected to suitable valves 26 and 27 (FIG. 3). The valves 26 and 27 are adapted to control the movement of the pistons (not shown) in the cylinders 40 through a plurality of cylinder-controlling conduits 28 and 29. Conduit 29 controlled by valve 27 supplies hydraulic fluid under pressure to the rear of the piston in the cylinder 40 to permit gripper heads 41 to be moved toward the side walls 5a of the tank 5. Conduit 28 controlled by valve 26 supplies fluid under pressure to the front of the piston in cylinder 40 to move the heads 41 away from the side walls 5a. Since the fluid under pressure is supplied to each cylinder 40 from a single source, each gripper head 41 will move independently of the others until it engages the side walls 5a of the tank 5 at which point the gripper head will stop, since the fluid under pressure is sufficient only to move the pistons and heads outwardly into engagement with the tank walls. However, if the other gripper heads 41 have not come into contact with the side walls 5a of the tank 5 they will continue to move until they do strike the side walls 5a. Thus each gripper head is assured of bearing against and firmly gripping the side walls 5a of the tank 5.

The valves 26 and 27 also control the evacuation of air from the suction grooves 44 of the gripper heads 41 (FIG. 3) after the gripper heads have come into contact with the side walls of the tank.

The operation of this invention will be obvious from the above description. As the tank 5 formed in the mold 4 moves on conveyor 7, it stops beneath the frame 1. The gripper head assemblies 33 are lowered by the actuation of vertical lifting cylinders 20.

Each gripper head 41 is then moved outwardly against the side walls 5a of the tank 5 by fluid under pressure passing in conduits 29 controlled by valve 27 so that each gripper head 41 bears against the side walls 5a with sufficient pressure to grip the tank firmly but not enough pressure to cause an impression in the side walls 5a or to deform the side walls. Since the gripper heads 41 move independently of each other, each one will move forward until it strikes the tank walls 5a and its movement is arrested thereby. Air is then evacuated from the suction grooves 44 in the face of the gripper heads 41 so that a vacuum is created to permit the gripper heads 41 to grip the tank walls 5a firmly.

When in firm contact with the tank walls 5a the gripper heads 41 together with the tank are lifted out of the mold 4 by the activation of vertical lifting cylinders 20. When the tank 5 clears the upper edge of the mold 4, the horizontal cylinder 13 is actuated to slide or roll the carriage 10 on rails 11 along the horizontal portion 9 of the frame 1 thus moving tank 5 over the take-off conveyor 8. The lifting cylinders 20 are then actuated to lower the gripper head assemblies 33 and the tank 5 until the tank 5 rests on the take-off conveyor 8. At this point, the suction grooves 44 in gripper heads 41 are returned to atmospheric pressure to break the vacuum and permit the tank walls 5a to be released. The gripper heads 41 are then withdrawn by fluid under pressure passing in conduits 28 controlled by valve 26 and the assemblies 33 then lifted out of the tank to permit the tank to be moved by conveyor 8.

It will thus be seen that the present invention provides an improved tank lifting mechanism in which the tanks are firmly gripped by individually moving gripper heads thereby reducing any danger of a tank falling off and which will not leave an imprint on the side walls.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An article lifting mechanism comprising a frame, means moving said frame to a position spaced from an article to be lifted, a plurality of gripper head assemblies carried on said frame, each gripper head assembly comprising a controlling cylinder having a piston therein and a gripper head mounted on the piston, each of said gripper heads having a suction groove from which air is to be evacuated, means on said frame supplying fluid to said controlling cylinders for independently moving each piston and its respective gripper head relative to the frame and with the same force against said article to be lifted as the frame is maintained in a stationary position, the movement of each gripper head being stopped by engagement with said article such that each gripper head contacts and engages the articles with the same force irrespective that some gripper heads may have moved further than others, and means on said frame for evacuating such suction groove to create a reduced pressure in said gripper heads to permit each of the heads to grip the article with a substantially equal force to reduce the tendency of the gripper head to distort and otherwise damage the article.

2. An article lifting mechanism comprising a frame, a plurality of gripper head assemblies carried on said frame, each of said gripper head assemblies comprising a controlling cylinder having a piston therein and a gripper head mounted on the piston, each of said gripper heads having a suction groove means from which air is to be evacuated, means on said frame supplying fluid under pressure to each of said cylinders to permit the pistons and the gripper heads carried thereon to move independently relative to the frame and each with the same force against said article to be lifted as the frame is maintained in a stationary position, the movement of each gripper head being arrested by engagement with said article, and means on said frame for evacuating said suction groove means to create a reduced pressure in said gripper heads to permit each of the heads to grip the article with a substantially equal force to thereby reduce the tendency of the gripper heads of distorting and otherwise damaging the article.

3. An article lifting and transfer mechanism comprising a frame, a plurality of gripper head assemblies carried on said frame, each gripper head assembly having a controlling cylinder with a piston therein and a gripper head mounted on each piston, each of said gripper heads having suction cup means from which air is to be evacuated, lifting means for vertically moving said frame relative to an article to be lifted, means on said lifting means for supplying fluid under pressure to each of said cylinders to permit the pistons and the gripper heads carried thereon to be independently moved relative to the frame and against said article as the frame is maintained in a stationary position, means on said frame for evacuating said suction cup means to create a vacuum therein so that the article will be gripped thereby, means moving said lifting means horizontally from a position above the article to be lifted to a position laterally displaced therefrom, and means for breaking the vacuum in said gripper head to release said article after the latter has been moved to said laterally displaced position.

4. In combination, a lifting mechanism and a hollow open top article to be lifted thereby, comprising a frame, a plurality of gripper head assemblies carried by said frame, said frame and gripper head assemblies being constructed and arranged as to be received in said hollow article through said open top, each of said gripper head assemblies mounting suction means, means for evacuating said suction means to create a vacuum therein, means on said frame for independently moving each gripper head relative to the frame along a straight line path and with substantially the same force against the inside walls of said article to be lifted as the frame is maintained in a stationary position, the movement of each gripper head being arrested by engagement with the inside walls of said article such that each gripper head contacts and engages the article with the same force irrespective that some gripper heads may have moved further than others, and means for moving said frame in a horizontal and a vertical direction such that the frame is operable to be lowered into said hollow article, to grip and raise the latter and thereafter transfer it horizontally to another position where it is released.

5. An article lifting mechanism as set forth in claim 2 wherein said means for supplying fluid under pressure comprises a control valve operable to simultaneously supply fluid under pressure to each of said gripper head assemblies from a single source of fluid supply under pressure such that each gripper head is operated simultaneously and with the same force.

6. An article lifting mechanism comprising a frame, a plurality of gripper head assemblies carried on said frame, each of said gripper head assemblies comprising a controlling cylinder having a piston therein and a gripper head mounted on the piston, means on said frame supplying fluid under pressure to each of said cylinders to permit the pistons and the gripper heads carried thereon to move independently relative to the frame and each with the same force against said article to be lifted as the frame is maintained in a stationary position, the movement of each gripper head being arrested by engagement with said article, and means on said frame creating a reduced pressure in said gripper heads to permit each of the heads to grip the article with a substantially equal force to thereby reduce the tendency of the gripper heads of distorting and otherwise damaging the article, each of said gripper heads comprising a body member having a flat face with grooves therein, and a sealing ring made of a resilient material carried on said body and having a peripheral portion thereof extending beyond said flat face and adapted to be flexed to a position where said peripheral portion is co-planar with the flat face to thereby seal the flat face and grooves therein as air is evacuated from the latter.

7. An article lifting mechanism comprising a frame, a plurality of gripper head assemblies carried on said frame, each of said gripper head assemblies comprising a controlling cylinder having a piston therein and a gripper head mounted on the piston, means on said frame supplying fluid under pressure to each of said cylinders to permit the pistons and the gripper heads carried thereon to move independently relative to the frame and each with the same force against said article to be lifted as the frame is maintained in a stationary position, the movement of each gripper head being arrested by engagement with said article, and means on said frame creating a reduced pressure in said gripper heads to permit each of the heads to grip the article with a substantially equal force to thereby reduce the tendency of the gripper heads of distorting and otherwise damaging the article, each of said gripper heads comprising a body having a flat face, a plurality of suction grooves in said flat face from which air is to be evacuated to create a reduced pressure therein, an indentation in the side wall of said body, a resilient sealing ring having a peripheral portion extending beyond said flat face adapted to be flexed to seal the peripheral edge of said flat face, said sealing ring having a rearwardly extending flange overlying said indentation in said body side wall, and a strap on said flange in overlying relation to said identation to hold the sealing ring in place.

8. The method of lifting an article which comprise the steps of independently moving gripper heads adjacent the inside walls of an article to be lifted with pressure sufficient to grip the article but insufficient to deform the article, creating a reduced pressure in said gripper heads to cause the heads to grip said article, moving said gripper heads in a transverse direction to locate the article at a position remote from its initial position, lowering said lifting mechanism to deposit the article in said remote position, breaking the vacuum in said gripper heads to cause the gripper heads to release said article, and moving the gripper heads upwardly away from the article.

9. The method of lifting an article which comprises the steps of independently moving gripper heads adjacent the inside walls of an article with pressure sufficient to grip an article but insufficient to deform the article, creating a vacuum in said gripper heads to cause the heads to grip said article, moving said gripper heads upwardly to lift the article, moving said gripper heads in a transverse direction to position the article over a take-off mechanism, lowering said lifting means to deposit the article on said take-off mechanism, breaking the vacuum in said gripper heads to cause the gripper heads to release said article, and moving the gripper heads upwardly away from the article.

References Cited in the file of this patent
UNITED STATES PATENTS

| | | |
|---|---|---|
| 1,228,690 | Monnet | June 5, 1917 |
| 1,792,576 | Dryon | Feb. 17, 1931 |
| 1,996,385 | Owen | Apr. 2, 1935 |
| 2,203,799 | Shaffer | June 11, 1940 |
| 2,247,787 | Schmidt | July 1, 1941 |
| 2,819,806 | Vieth | Jan. 14, 1958 |
| 2,890,077 | Littell | June 9, 1959 |
| 3,010,588 | McBean | Nov. 28, 1961 |